Sept. 20, 1955
E. W. ERDMAN
2,718,371
THROTTLING GATE VALVE
Filed Sept. 19, 1952
3 Sheets-Sheet 1
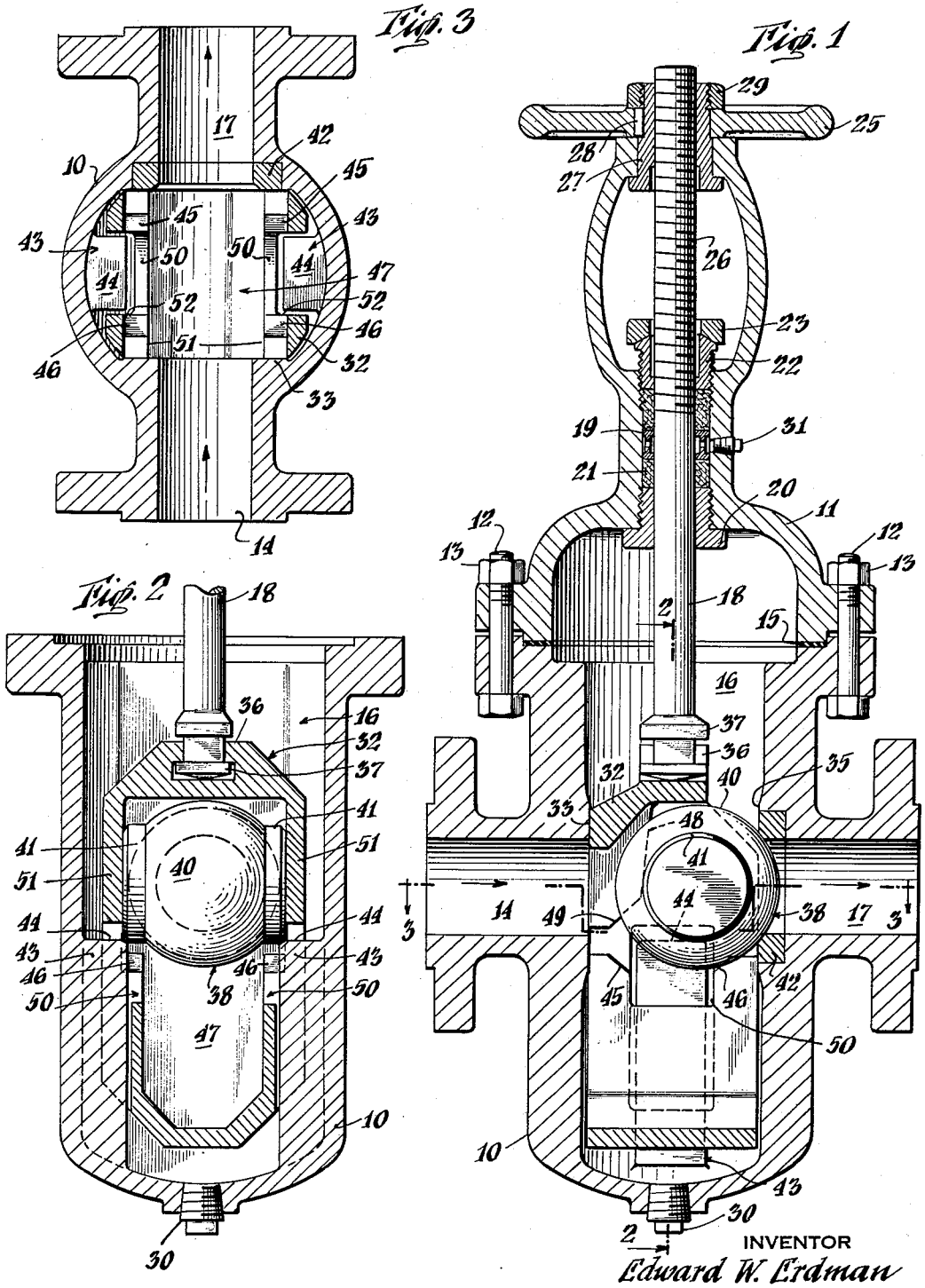
INVENTOR
Edward W. Erdman
BY
Robert S. Dunham
ATTORNEY

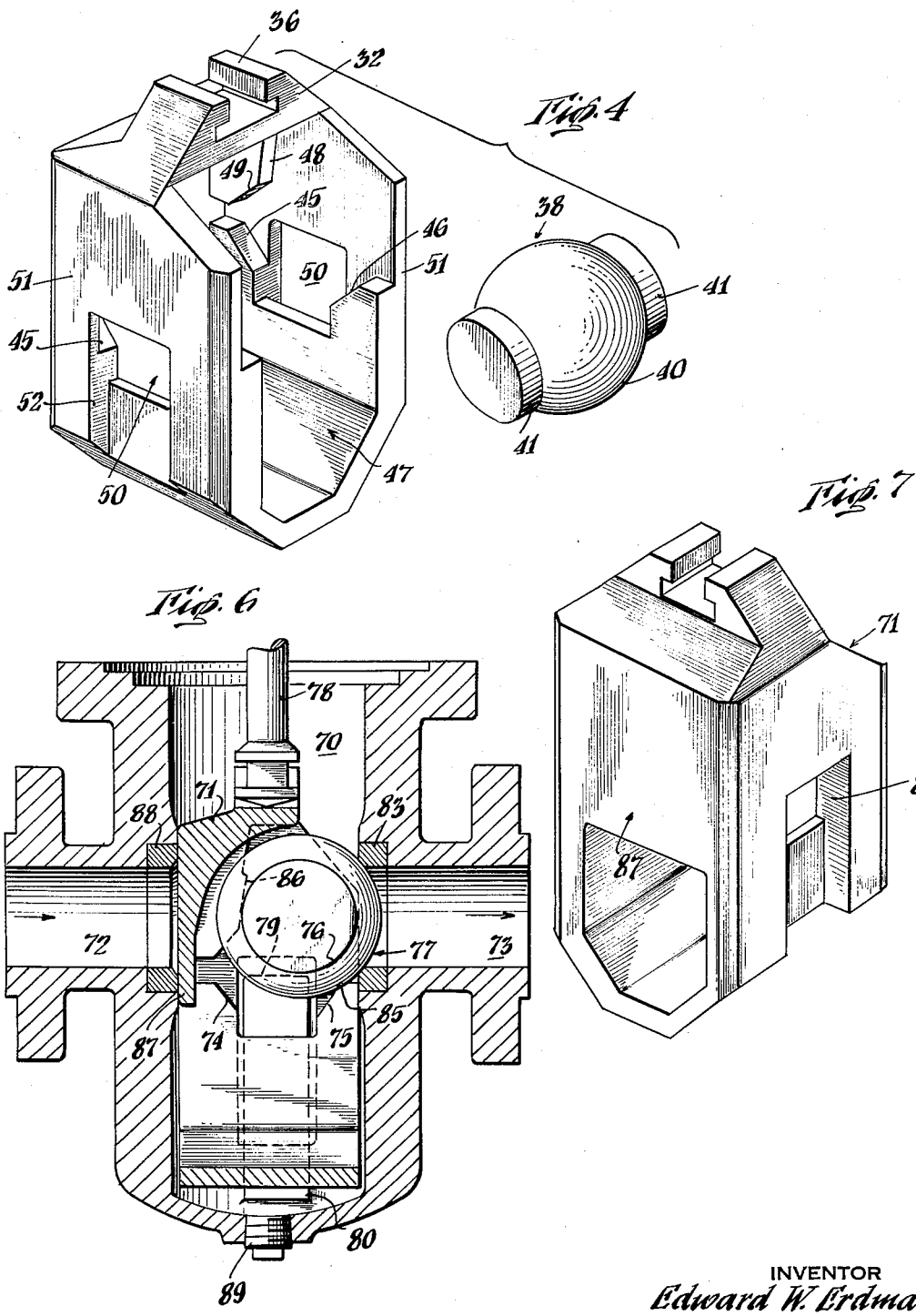

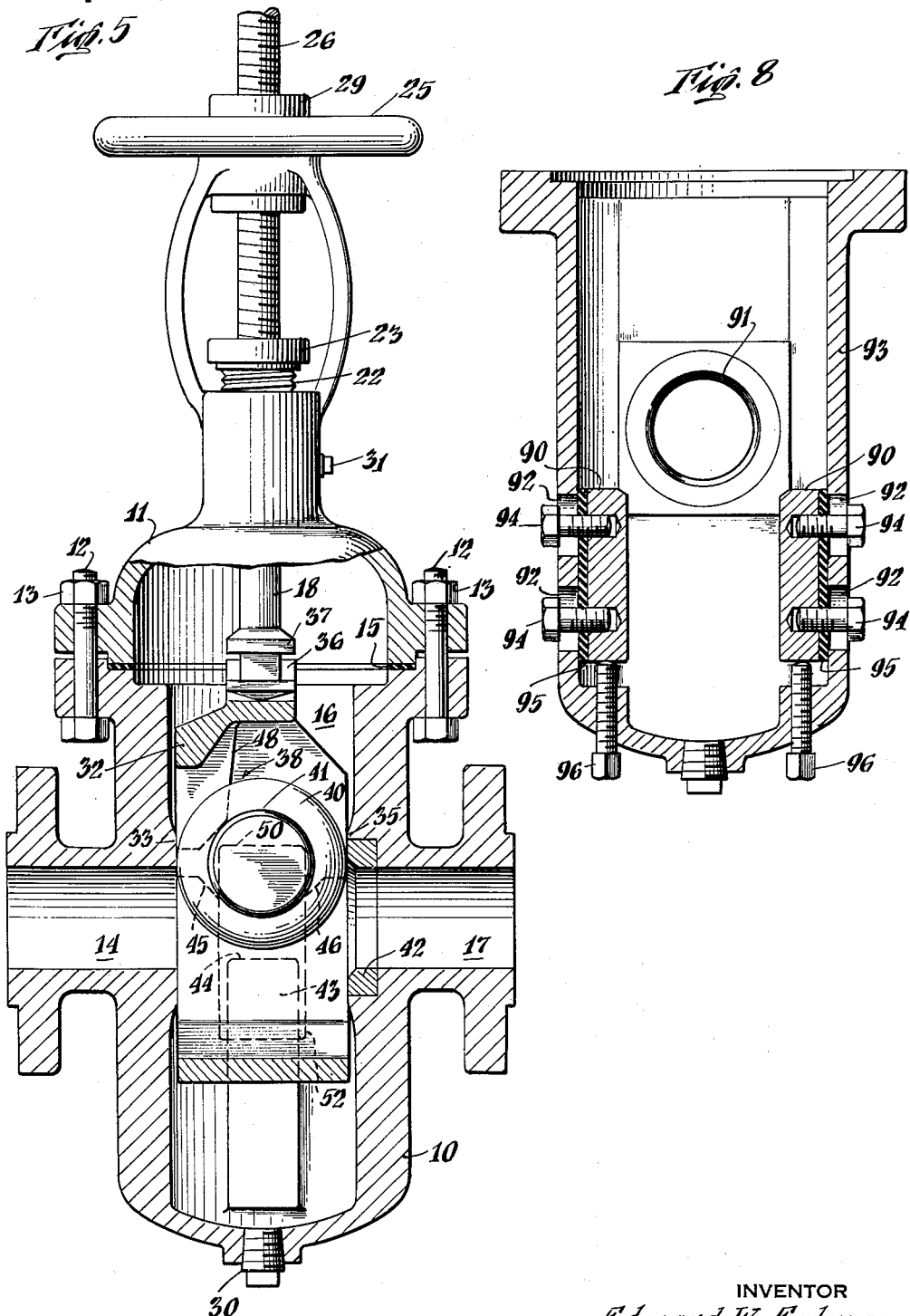

United States Patent Office 2,718,371
Patented Sept. 20, 1955

2,718,371

THROTTLING GATE VALVE

Edward W. Erdman, Brooklyn, N. Y., assignor of one-fourth to Edward D. Lampard, Brooklyn, N. Y.

Application September 19, 1952, Serial No. 310,443

7 Claims. (Cl. 251—84)

This invention relates to an improved valve mechanism to control the flow of fluid through a pipeline, and more particularly to a valve mechanism which has improved throttling characteristics.

In throttling valves, spheres or balls have been used as the valve means, the sphere being moved into position in a valve seat to close the valve, being moved out of the valve seat to open the valve and being disposed at intermediate positions for throttling or controlling flow. In order to move the sphere or ball, it has been necessary to engage the surface thereof, for example, when it is desired to cam the sphere out of the valve seat under fluid pressure and to cam the sphere into the valve seat to assure closure of the valve. The direct contact on the sphere surface when excessive pressure is exerted has resulted in flattening, denting, galling or grooving of the spherical surface with the result that after a time the valve will leak at various points where it does not seat properly in the valve seat. In addition to this disadvantage of the ball type valve, the control over the ball has been by means of a cage adapted to move the ball into and out of the position where it is received in the valve seat. However, because of the spherical surface and the necessity of holding the ball loosely to assure the positive seating thereof in the seat ring, the control over the ball has been impositive, and at times the ball has become jammed in the cage and has performed erratically.

An important object of the invention is to provide a valve in which a spherical surface engaging the seat ring cannot be dented or otherwise damaged by the means for moving the spherical body into and out of the seat ring.

Another object of the invention is to provide a cheaper and more effective valve structure.

A further object of the invention is to provide a structure in which the valve member can be better controlled although loosely held so that it cannot jam in its supporting means nor behave erratically.

A still further object of the invention is to provide a valve mechanism which may be easily and positively opened and closed without damage to the spherical surface which engages the seat ring.

The invention consists of a valve mechanism for controlling fluid flow having a hubbed spheroid valve member, that is a spheroid having hubs extending from the spherical surface thereof and a cradle adapted to support the hubbed spheroid by the hubs and to move the spherical surface into and out of position for seating in a valve seat ring. The invention also includes stop means cooperating with the cradle to hold the hubbed portions of the spheroid in position to be properly seated while the cradle member positively seats the spheroid by pressure against the hubs thereof.

For a more complete description, reference is made to the drawings wherein:

Fig. 1 is a vertical section taken through a standard valve structure and showing a valve mechanism embodying the invention with the valve in the closed position;

Fig. 2 is a vertical section at right angles to the view in Fig. 1 and taken along the lines 2—2 in Fig. 1;

Fig. 3 is a cross-section of the valve mechanism taken along the line 3—3 in Fig. 1;

Fig. 4 is a perspective view of the front, top and side of the cradle and of the hubbed spheroid of the valve mechanism;

Fig. 5 is a vertical section similar to Fig. 1 showing the valve in a partially open position;

Fig. 6 is a vertical section of an alternate form of valve mechanism in which an upstream gate is provided;

Fig. 7 is a perspective view of the rear, top and side of the alternate form of cradle indicating the upstream sealing means; and Fig. 8 is a side view similar to Fig. 2 showing a modified form of stop means which are adjustable.

Referring to Fig. 1, a standard valve structure is shown including a body portion 10, bonnet portion 11, joined by stud bolts 12 and nuts 13 with gasket 15 to seal valve chamber 16. Normal fluid flow through the valve is from the inlet or upstream channel 14 to the outlet or downstream channel 17 in the direction of the arrows. A valve stem 18 passes upwardly through the bonnet bushing 20, the packing 21, the lantern ring 19, the gland 22, and the gland follower 23. Movement of the stem is effected by turning the hand wheel 25 causing the threaded portion 26 of the stem 18 to move vertically through the threaded stem nut 27 to which the hand wheel is fixed by a key 28 and the lock nut 29. The usual pipe plugs are at 30 and 31.

The valve mechanism of this invention includes the cradle 32 which is of a size to fit within the valve chamber 16 in sliding engagement with the walls 33 and 35 of the valve chamber 16. The cradle 32 is slotted at its upper end 36 to releasably engage the slotted end 37 which is provided at the lower end of the stem 18. The cradle 32 is adapted to receive a hubbed spheroid 38, see Fig. 4, having a spherical surface 40 and two hubbed portions 41 which, as illustrated, may extend coaxially from two sides of the spherical central portion. The spherical surface of the valve member 38 is such that it may be releasably received in valve seat ring 42 which is disposed at the juncture of the valve chamber 16 and the downstream channel 17.

Considering now in detail the cradle member 32, such member may be formed either by casting or forging or may be machined from bar stock. As noted above, the cradle is provided with an upper T slotted section 36 adapted to engage the slotted head 37 of the conventional valve stem 18. The inside of the cradle is formed as shown with two lower cradle abutment portions 45 and 46 on each side which extend into the cradle chamber 47 only far enough to receive the hubs or trunnions 41 of the valve member 38. Above the cradle-like abutment portions 45 and 46 are sloping cam portions 48 on either side of the cradle chamber and guiding abutment portions 49. The cam portions 48 and the guiding portions 49 also extend only far enough into the chamber 47 to engage the hubs 41. All the abutments in the chamber are arranged to be out of contact with the spherical surface 40 of the hubbed spheroid valve member 38. The cradle-like abutment portions 45 and 46 are separated by openings 50 which extend through side walls 51 of the cradle member 32. The side walls 51 of the cradle member are provided with vertically extending grooves 52 adapted to receive ribbed stop member 43 which may be integral portions of the body 10, as best shown in Figs. 2 and 3.

The two stop members 43 are provided for engaging the hubs 41 of the valve member 38 to support the valve member at the valve seating level as shown in Figs. 1 and 2. Said stop members which may be integrally formed in the body 10 of the valve structure may also be separate adjustable members, as shown in the alternate form in Fig. 8, so that they may be vertically adjusted to dispose the hubbed spheroid at the proper valve seating level.

As will be noted, the stops 43 contact the hubs through the openings 50 by extending into the cradle chamber 47, as shown in Figs. 2 and 3.

The stop members 43, as indicated most clearly in Fig. 3 also perform the additional function of providing guides for the cradle 32 and thereby prevent misalignment of the cradle in the valve chamber 16.

In operation the hubbed spheroid valve member 38, shown in Fig. 4, is assembled in the cradle member 32 with the hubs 41 cradled on the members 45 and 46, as shown in Fig. 5. In this position, the valve is partially open so that the fluid may flow through the inlet channel 14 and outlet channel 17 of the valve, the fluid being permitted to pass through the lower part of the cradle chamber 47 subject to the throttling effect of the hubbed spheroid obstructing the passage between the upper part of each of said channels 14 and 17. Such throttling action is effective in accurately controlling flow through the valve. By raising the cradle 32 slightly higher, the hubbed spheroid will be completely out of passage between the two channels and fluid may flow through the lower part of the cradle chamber 47 with a minimum of obstruction. In order to close the valve, hand wheel 25 is turned to move the stem 18 downwardly so that the cradle 32 and the hubbed spheroid 38 supported therein is moved from the position shown in Fig. 5 to that shown in Fig. 1. As the cradle 32 moves downwardly, the hubs 41 of the hubbed spheroid are contacted by upper surfaces 44 of the stop members 43 which extend into the cradle chamber 47 through the openings 50, a sufficient distance to engage said hubs, as best shown in Fig. 2. The upper surfaces 44 of the stops 43 are at a level so that the axis of the hubbed spheroid is in alignment with the axis of the outlet channel 17 so that the hubbed spheroid will properly seat in seat ring 42. When fluid is passing through the valve, the hubbed spheroid will be seated in the seat ring 42 by the fluid pressure. However, if no fluid is passing through the valve, the valve member 38 will be moved into sealing position by means of the sloping cam surfaces 48 which cam against cylindrical surfaces of the hubs 41 causing the hubs of the hubbed spheroid 38 to roll across the surfaces 44 of the stops 43 until the spherical surface 40 positively seats in the seat ring 42. While the valve is closed, the cams 48 continue to exert pressure through contact with the hubs 41 to maintain the spherical surface 40 in the seat ring.

In order to open the valve, the valve stem 18 is raised so that the sloping surfaces of abutments 46 in the cradle are brought into contact with the hub portions 41 of the valve member 38. As the cradle 32 is raised further by the valve stem 18, toward the position shown in Fig. 5, the sloping surfaces of the abutments 46 exert a camming action on the hubs 41 to move the hubbed spheroid out of the seat ring 42. When the seal is broken between the spherical surface of the hubbed spheroid valve 38, the hubs 41 will move toward the cradled position between the sloped abutments 45 and 46 as shown in Fig. 5.

Figs. 6 and 7 show an alternate form of the invention in which, in addition to the hubbed spheroid valve structure, there is a supplementary upstream gate valve. The hubbed spheroid valve structure is substantially like that shown in Figs. 1, 2 and 3, except that valve chamber 70 is slightly larger than the valve chamber 16, in order to accommodate cradle 71, which is of slightly larger dimensions from inlet or upstream channel 72, to outlet or downstream channel 73. The function of the cradle 71 with respect to the hubbed spheroid is essentially the same in the alternate form shown in Figs. 6 and 7 as in the Figs. 1 to 5. Members 74 and 75 cradle hub portions 76 of hubbed spheroid valve member 77, and as the cradle is moved downwardly by stem 78 into the valve closing position shown in Fig. 6, upper surfaces 79 of stop members 80 engage the hub portions 76 through openings 81 formed in the cradle member 71 so as to align the hubbed spheroid 77 in the seat ring 83 with its spherical surface 85 in proper seating position. The sloping surface 86 acts to cam the hubbed spheroid 77 into properly seated position and to maintain it in that position while the valve is closed.

In addition to the hubbed spheroid valve, the cradle of the alternate form shown in Figs. 6 and 7 includes a downwardly extending skirt portion 87. The inlet or upstream side, i. e., at the juncture of channel 72 with valve channel 70, of the valve is provided with a valve seat ring 88. With this arrangement, when the cradle 71 is moved to closed position as shown in Fig. 6, the skirt portion 87 acts as a gate valve in conjunction with the seat ring 88 to close the upstream side and the hubbed spheroid 77 and the seat ring 83 act to close the downstream side of the valve.

In the arrangement shown in Figs. 6 and 7, if the downstream seat ring 83 becomes worn, it is possible to reverse the entire valve body in the line and also reverse the cradle within the valve chamber so as to use the upstream seat ring to receive the spherical surface 85 of the hubbed spheroid 77.

In order to open the alternate form of valve shown in Figs. 6 and 7, the cradle 71 is raised by the stem 78 in the usual manner and the angular abutments 75 engage the hubs 76 on either side of spherical surface 85 so as to cam the hubbed spheroid 77 out of the seat ring 83, and at the same time, the skirt portion 87 which is integral with the cradle member 71 moves upward so that flow may be resumed through the channels 72 and 73. The use of the upstream gate is useful in installations in which it is desired to keep fluid out of the valve chamber 70 during periods when the valve is closed. To accomplish this, when the valve is closed with the gate 87 closing the upstream inlet, drain plug 89 is open to permit fluid in the chamber 70 to be drained out.

As will be noted from Fig. 3, the cradle has a rectangular shape and is arranged for sliding engagement with the upstream and downstream faces of the valve chamber 16.

As an example of suitable angular shapes for the several abutments and cam surfaces in the cradle chamber, it may be noted that the cam surfaces 48 may be disposed at a 10° slope to the vertical line of the cradle 32. The guiding wedge sections 49 may be disposed at a 40° slope from the vertical centerline. The function of these wedge sections is to guide the hubbed spheroid into the position shown in Fig. 5, in which the hubs 41 are supported by the cradle-like abutments 45 and 46. The cradle-like abutments 45 and 46 may have a slope of about 40° from the vertical. As noted, the function of the cradle-like abutments 46 is to engage the hubbed portions 41 of the hubbed spheroid 38 and cam it out of the seated position shown in Fig. 1 and into the cradle position shown in Fig. 5 when opening the valve. In closing the valve, the members 45 and 46 center the hubbed spheroid so that it is properly guided to engage the upper surfaces 44 of the stops 43. During the upward and downward movements, the cradle 32 is prevented from rotating about the centerline of the valve body in its flat surfaces sliding along the upstream and downstream flattened sections of the chamber 16 and by the two guide slots sliding along the stops 43, as best shown in Fig. 3. It will be noted that the slopes of the abutments 45 and 46 are such that while cradling the hubs 41 on the sloped portions, the hubs cannot become jammed between said slopes. It will be appreciated that the slopes of the various members in the cradle chamber 47 may be varied as desired.

The valve mechanism of this invention is particularly well adapted to throttling the flow as well as in effectively opening and closing the valve, the throttling being achieved by positioning the cradle at intermediate positions such as shown in Fig. 5. In such intermediate positions, the pressure of the fluid will cause the hubbed spheroid to be drawn downward toward the seat ring. However, the cradle-like abutment portions 45 and 46 will positively and accurately retain the spheroid until the cradle 32 is moved downward as shown in Fig. 1 to the closed position where the cooperating stops 43 engage the hubs to properly position the hubbed spheroid to be received in the seat ring 42.

In a valve structure in which there is constant pressure, the stops 43 may be eliminated. However, the stops 43 are particularly effective in preventing overtravel in the closing of the valve when no pressure is in the line.

In the forms shown in Figs. 1–5 and 6, the stops 43 and 80, respectively, are integral rib portions of the valve body. However, as shown in Fig. 8, the stops such as stops 90 may be vertically adjustable to properly align the hubbed spheroid with the seat ring, such as ring 91. For this purpose, slots 92 may be provided in valve body 93. The stops 90 may be releasably held by bolts 94 passing through slots 92 and screwed into stops 90. Gaskets 95 may be provided to prevent leakage through the slots. Adjustment bolts 96 threaded through the bottom of valve body 93 and abutting the lower ends of stops 90 are rotatable for fine adjustment of said stops.

Valve structures including the mechanism of this invention are adaptable to wide ranges of use, being capable of controlling flow in pipelines, for example, from 1" diameter to 24" diameter, there being no limit on the size other than practical considerations, and for handling fluid pressures between 0 lb. p. s. i. a. to 10,000 lbs. p. s. i. and higher. It will be also understood that the valve may be opened and operated effectively with the structure disposed in the pipe in any position, and regardless of whether or not fluid is passing through the valve.

If the valve is installed inverted from the position shown in Fig. 1, i. e. with the handle 25 down, the hubbed spheroid 38 is maintained in operative position when out of the closed position by being cradled by the guiding wedge sections 49 in engagement with the hubs 41 and by the spheroid in rolling engagement with the wall 35 of the chamber 16. As the cradle moves the hubbed spheroid to the closed position, the spherical surface 40 is rolled into the seat ring and held in that position by the camming action of the surfaces 48 acting on the hubs 41. Even in the inverted position, no camming pressure is exerted on the spherical surface for in its movement along the wall 35 it is merely in rolling contact. Furthermore, if there is pressure or fluid flow through the line, the hubbed spheroid will be drawn into the cradled position between abutments 45 and 46 regardless of how the valve is oriented.

From the foregoing description of the two forms of the invention, it will be appreciated that by use of the novel arrangement of this invention including the cradle, the hubbed spheroid and the stop members cooperating with the cradle, the spherical faces of the spheroidal valve member may be accurately positioned in the valve seat ring and may be locked in the seat ring and may be removed from the seat ring without contacting any portion of the spherical surface of the valve member. The abutments and cam surfaces in the cradle and the stops cooperating with the cradle all act only upon the hub or trunnion portions of the hubbed spheroid so that no damage by denting or flattening or scarring of the spherical surface can occur during the opening and closing operations of the valve.

Furthermore, it will be appreciated that my providing hub portions on the spherical valve member, the valve member can be more accurately and positively controlled than in the case in which the valve member is a complete sphere. The hubbed spheroid, however, is free to rotate about the axis of the hubs so that it may readily adjust to the seat ring and present different portions of the spherical surface to thereby prevent any grooving of said surface from continued and repeated contact of the seat ring with any given portion of the spherical surface. In this regard, it may be noted that there is limited clearance between the flat ends of the hubs of the hubbed spheroid and the vertical walls of the cradle chamber, and limited clearance between the cradle and the upstream and downstream walls of the valve chamber so that the hubbed spheroid may oscillate slightly about the vertical axis of the valve body in addition to being free to rotate about the axis of the hubs so as to insure positive entry of, and sealing by the spherical portion of the hubbed spheroid in the bevelled seat ring. However, such oscillation is not so great that any portions of the hubs engage the seat ring. Nor is it possible for the hubs to become jammed between the vertical walls of the cradle chamber.

In addition to the operative advantages obtainable with the use of the hubbed spheroid type of valve member, it will also be appreciated that a hubbed spheroid may be precision machined or ground from bar stock or forged or cast in either solid or hollow form at considerably less cost than the cost of producing a perfectly spherical ball valve.

A further advantage of the valve mechanism of this invention is that the inclined surfaces 46 and 48, in Figs. 1 to 5, and the inclined surfaces 75 and 86 in Fig. 6 in effecting their cam action contact the cylindrical surfaces of the hubs 41 and 76 of the figures, respectively, in a line contact, and therefore a more efficient camming action is achieved than would be the case if the cams were acting on a complete sphere, for in the latter case the contact between the cam surfaces and the sphere would be only a point contact. It will be appreciated that in addition to being a more efficient contact in the case of the hubbed spheroid, there is no contact with the spherical surface of the hubbed spheroid and the stress on the hubs is reduced because of the line contact with the cams, whereas in the case of the completely spherical valve member the cam action is on the spherical surface itself, and the surface pressure because of the point contact is considerably greater, and therefore the marring or damaging of the sphere is all the more aggravated.

Because of the marring or damaging of the sphere, frequent replacements of the ball valves are necessary even though such spheres or balls have been specially hardened to resist marring, whereas in the case of the hubbed spheroid of this invention, no marring results from the camming of the spheroid valve into and out of the seat ring. Furthermore, such hubs may be hard surfaced with greater ease than complete spheres. With the hard surfaced hubs, the life of such hubbed spheroid type of valve is considerably increased apart from considerably greater useful life such valves have because of their improved operative characteristics.

As a result of using a hubbed spheroid, the cylindrical hubs absorb heavy radial stress when the camming wedge portions of the cradle operating on the flat surfaces move upward to open the valve under full line pressure. Substantially none of these stresses are translated to distort the spherical portion of the hubbed spheroid. The same is true of the stresses set up when the spherical portion is locked in the seat ring.

In accordance with the provisions of the patent statutes, I have herein described the principle of operation of the invention, together with the elements which I now consider the best embodiments thereof, but I desire to have it understood that the structure disclosed is only illustrative and the invention can be carried out by other means. Also, while it is designed to use the

Having thus described my invention, I claim:

1. A valve mechanism comprising, a valve seat and a valve member having a spherical surface adapted to fit said seat and having coaxial hubs extending from the spherical surface, cooperating movable cams adapted to act against said hubs for holding the valve member in said seat when said cams are moved in one direction and other movable cams for removing it from said seat when said other cams are moved in another direction.

2. In a valve body, a valve mechanism, comprising, a hubbed spheroid, a cradle adapted to receive said hubbed spheroid and releasably and loosely support it by its hubs, a valve seat adapted to receive the spherical portion of the hubbed spheroid, cam surfaces in said cradle operative, upon movement of the cradle in selected directions, with respect to the valve seat, for contacting the hub portions of the hubbed spheroid for selectively camming the spherical portion into the valve seat and for camming the spherical portion out of the valve seat.

3. A valve structure comprising, a spherical valve member, a valve seat adapted to receive the valve member in releasable sealing relationship, hubs extending from the valve member, a movable cradle adapted for releasably and loosely supporting the hubs extending from the valve, cam surfaces on the cradle, said cradle being movable in selected directions for selectively camming the hubbed portions of the valve member into and out of sealing relationship with the valve seat.

4. The apparatus of claim 3 wherein the said valve seat is positioned in a downstream channel, another valve seat disposed in an upstream channel, and a valve gate movable with the cradle for sealing the upstream channel when the cradle is positioned for sealing the downstream channel.

5. In a valve body defining a valve chamber having an inlet and outlet through said chamber with a seat ring disposed at the juncture of the outlet at said chamber, a valve mechanism, comprising, a cradle connected to a stem and vertically adjustable therewith, said cradle defining a chamber, a hubbed spheroid adapted to be received and loosely held in said cradle chamber, cradle-like portions within the cradle chamber adapted to releasably support the hubbed spheroid by hub portions extending from said spheroid, openings formed in the sides of the cradle, stops adapted to engage the hub portions through said openings for supporting the spheroid at a predetermined level with respect to the seat ring and cam surfaces in the cradle adapted to act against the hub portions for moving the hubbed spheroid into and out of contact with the seat ring when the cradle is moved relative to the stops while said hub portions are supported by the stops.

6. In a valve structure, a valve mechanism, comprising, a hubbed spheroid having a spherical portion and having hubs, a cradle adapted to receive said hubbed spheroid, said cradle having means for loosely and releasably supporting said hubbed spheroid by its hubs, a valve seat adapted to receive the spherical portion of the hubbed spheroid, said cradle being movable relative to said valve seat, stops for alternatively supporting the hubs, said stops being maintainable in fixed relation to the valve seat, cam surfaces in said cradle adapted to cam the hubs of the hubbed spheroid when the hubs are supported by the stops when the spherical portion of the hubbed spheroid is in the valve seat ring for moving the hubbed spheroid respectively into and out of the valve seat ring.

7. The valve mechanism of the preceding claim 6, wherein the stops are adjustable to selected positions with respect to the valve seat ring.

References Cited in the file of this patent

UNITED STATES PATENTS

| | | |
|---|---|---|
| 281,081 | Kelly | July 10, 1883 |
| 414,509 | Fisher | Nov. 5, 1889 |
| 440,025 | Fisher | Nov. 4, 1890 |
| 1,044,124 | Bessert | Nov. 12, 1912 |
| 1,875,574 | Duncan | Sept. 6, 1932 |
| 2,037,844 | Wright | Apr. 21, 1936 |
| 2,504,924 | Fennema | Apr. 18, 1950 |
| 2,629,578 | Paul | Feb. 24, 1953 |